G. GERALDSON.
AEROPLANE LAUNCHER AND LANDER.
APPLICATION FILED JAN. 14, 1909. RENEWED FEB. 28, 1910.
968,339.
Patented Aug. 23, 1910.
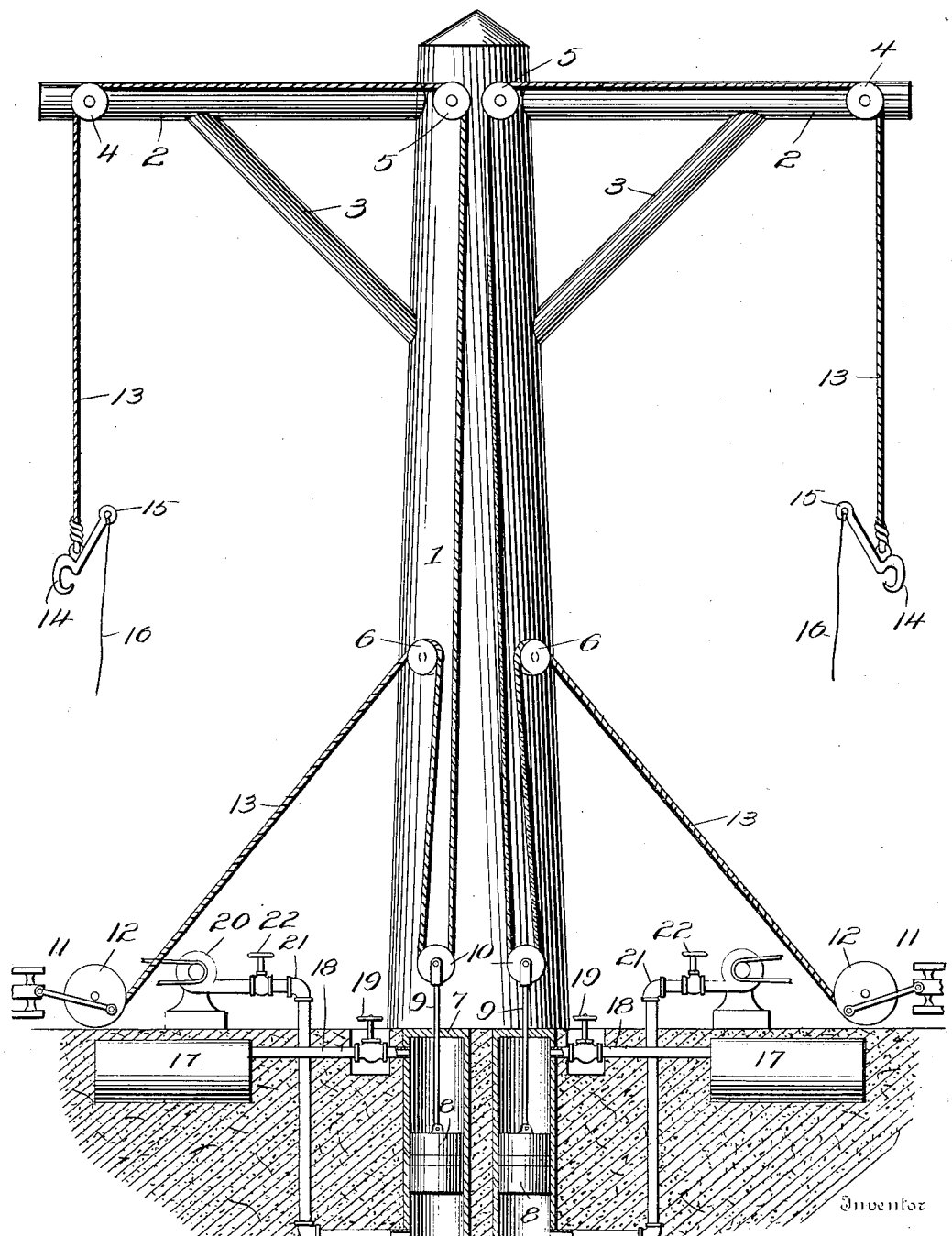

UNITED STATES PATENT OFFICE.

GERALD GERALDSON, OF NEWCASTLE, CALIFORNIA.

AEROPLANE LAUNCHER AND LANDER.

968,339.     Specification of Letters Patent.     Patented Aug. 23, 1910.

Application filed January 14, 1909, Serial No. 472,319. Renewed February 28, 1910. Serial No. 546,548.

*To all whom it may concern:*

Be it known that I, GERALD GERALDSON, a citizen of the United States, residing at Newcastle, in the county of Placer and State of California, have invented new and useful Improvements in Aeroplane Launchers and Landers, of which the following is a specification.

This invention is an improved structure for launching and landing aeroplanes to enable them to start on and finish their flights without subjecting them to shocks and without injury either to the aeroplanes or their passengers and the said invention consists essentially in means for suspending and also for raising or lowering the aeroplane as hereinafter described and claimed.

The accompanying drawing is partly an elevation and partly a section of an aeroplane launcher and lander exhibiting one embodiment of my invention.

1 represents a tower of suitable height and structure provided at its upper end with cross arms 2. Braces 3 are preferably provided for the cross arms. Near the outer ends of the cross arms and near the upper end of the tower are sheaves 4, 5, respectively. Sheaves 6 are mounted at a suitable height from the ground. At the base of the tower are vertically disposed cylinders 7 which are preferably embedded in the foundation of the tower and in each of which operates a weighted piston or plunger 8. The said pistons or plungers may be of any suitable weight according to that of the aeroplanes in connection with which they are employed. A rod 9 extends upwardly from each piston or plunger through an opening in the head of its cylinder and carries a sheave 10 at its upper end. At suitable points are hoisting engines 11 which may be of any suitable type and each of which is provided with a hoisting drum 12. To each hoisting drum is connected one end of an elevating cable 13. Each cable passes from the hoisting drum over one of the sheaves 6, down under one of the sheaves 10, thence upward and over one of the sheaves 5, thence outward and over one of the sheaves 4 and to its pendent end is attached a suitable aeroplane locking and releasing device here illustrated as a hook 14, the bill end of which is of sufficient weight to cause such bill end to hang downward normally from the suspending cable, each hook being provided with an arm 15 to which is attached a releasing cord 16.

I preferably subject each weighted plunger or piston to the action of compressed air in the upper end of its cylinder and I also preferably form a vacuum either entirely or partially under each weighted plunger or piston. For the purposes of this specification, I show in connection with each cylinder a compressed air reservoir 17 for supplying compressed air to the cylinders and connected thereto by a pipe 18 having a valve 19 and I also show an air exhaust pump 20 in connection with each cylinder connected to the lower end thereof by a pipe 21 having a valve 22.

Aeroplanes for use in connection with my improved launcher and lander may be otherwise of any suitable construction but must be provided at their upper sides with rings or other suitable devices by means of which they may be suspended from the cables.

In the use of my invention for launching an aeroplane, the latter is first placed under one of the cross arms and the hook lowered and attached to the aeroplane and thereupon one of the hoisting engines is started and caused to draw upon the cable to which the aeroplane is connected so as to draw up the hooked end of the cable and the aeroplane, the weighted piston or plunger connected to said cable remaining stationary or comparatively so by reason of the action of the compressed air thereon. When the aeroplane has thus been raised a suitable height above the ground and is entirely clear of all surrounding objects, the operator controls the action of his propeller or propellers so as to cause the aeroplane while hanging from the cable to move first forwardly and then rearwardly, or in other words, the aeroplane is caused to swing while suspended from the tower. When the arc of movement of the aeroplane is of the required extent to give the necessary impulse to the aeroplane, the latter as it nears the end of forward swinging movement is released from its suspending hook, the latter being operated for this purpose by means of the cord 16 as will be understood, and hence the aeroplane is swung forward on its flight and the required initial impulse is imparted thereto.

To land an aeroplane, the latter is guided under one of the elevated hooks and connected thereto as it passes under the same, and the propellers of the aeroplane being stopped, the cable will stop the aeroplane, but not abruptly or violently as the aeroplane will swing upwardly with the cable and the latter will yield, owing to the action of the compressed air on the piston connected to the said cable, the piston moving upwardly and temporarily compressing the air to a great density, so that at the same time that the aeroplane pulls forwardly and upwardly on the cable the latter will be partially paid out. The result will be that the aeroplane will swing and after a few oscillatory movements can be lowered safely to the ground. The same paying out and cushioning action occurs in launching, as will be readily understood.

What is claimed is:—

1. Means for launching and landing an aeroplane and including a raising and lowering cable having an oscillating suspending element, means to cause said cable to raise or lower the aeroplane when attached to said suspending element, a movable piston element connected to the said cable, a cylinder in which said piston element operates, and means to supply said cylinder with fluid to yieldingly resist the movement of the piston element to permit paying out of the cable on the application of force to the oscillating element thereof.

2. In an aeroplane launching and landing apparatus, an oscillatory suspending element, and pneumatic means connected with said element to permit paying out of and for taking up the same, said pneumatic means being adapted to act as a cushion on the paying out motion.

3. In an aeroplane launching and landing apparatus, an oscillatory suspending element, a fluid pressure cylinder, and a piston in said cylinder and connected with said element, said piston being adapted to permit paying out of and taking up said element and to cushion the same on the paying out movement.

4. In an aeroplane launcher and lander, a supporting tower, a cable movably mounted on the tower and having a looped portion and an oscillatory suspending portion, means connected with the cable for raising and lowering the suspending portion, and pneumatic means including a cylinder and piston, the latter connected with the looped portion to permit paying out and for taking up the same, said means being adapted to operate as a cushion on the paying out movement.

In testimony whereof I affix my signature in presence of two witnesses.

GERALD GERALDSON.

Witnesses:
 BEN. P. TABOR,
 F. C. L. TABOR.